US005261149A

United States Patent [19]

Sutton

[11] Patent Number: 5,261,149

[45] Date of Patent: Nov. 16, 1993

[54] ROTARY PULLER LIVE CENTER ARRANGEMENT

[76] Inventor: Eric E. Sutton, P.O. Box 635, Whittier, Ak. 99693

[21] Appl. No.: 973,707

[22] Filed: Nov. 9, 1992

[51] Int. Cl.[5] .................. B23P 19/04

[52] U.S. Cl. .................. 29/261

[58] Field of Search .................. 29/256-262

[56] References Cited

FOREIGN PATENT DOCUMENTS 528392 7/1956 Canada .................. 29/261

*Primary Examiner*—Robert C. Watson

*Attorney, Agent, or Firm*—Leon Gilden

[57] ABSTRACT

A screw puller is operative in communication with a live center member, having a cylindrical housing, including a bottom wall with a spaced top wall annular flange, with a rotary hub mounted within the housing, with the rotary hub arranged to minimize frictional inter-relationship of the screw puller threaded shaft, with a workpiece to be drawn by the puller structure.

4 Claims, 4 Drawing Sheets

ROTARY PULLER LIVE CENTER ARRANGEMENT

BACKGROUND OF THE INVENTION

1. Field of the Invention

The field of invention relates to screw puller apparatus, and more particularly pertains to a new and improved rotary puller live center arrangement wherein the same is directed to minimizing frictional engagement with a puller screw relative to a workpiece.

2. Description of the Prior Art

The use of pulling apparatus, such as the type exemplified in the U.S. Pat. No. 4,011,648, frictional load is imposed upon the workpiece by the nose of the puller screw. To minimize such loads, the instant invention directs a positioning member having a rotatably mounted internal hub arranged to accommodate rotation of the screw and thereby minimize rotational drag upon an associated workpiece and in this respect, the present invention substantially fulfills this need.

SUMMARY OF THE INVENTION

In view of the foregoing disadvantages inherent in the known types of puller apparatus now present in the prior art, the present invention provides a rotary puller live center arrangement wherein the same is arranged to introduce a roller bearing structure between the puller and workpiece to minimize frictional resistance during rotation of the screw relative to the puller structure. As such, the general purpose of the present invention, which will be described subsequently in greater detail, is to provide a new and improved rotary puller live center arrangement which has all the advantages of the prior art puller apparatus and none of the disadvantages.

To attain this, the present invention provides a screw puller operative in communication with a live center member having a cylindrical housing, including a bottom wall with a spaced top wall annular flange, with a rotary hub mounted within the housing, with the rotary hub arranged to minimize frictional inter-relationship of the screw puller threaded shaft, with a workpiece to be drawn by the puller structure.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved rotary puller live center arrangement which has all the advantages of the prior art puller apparatus and none of the disadvantages.

It is another object of the present invention to provide a new and improved rotary puller live center arrangement which may be easily and efficiently manufactured and marketed.

It is a further object of the present invention to provide a new and improved rotary puller live center arrangement which is of a durable and reliable construction.

An even further object of the present invention is to provide a new and improved rotary puller live center arrangement which is susceptible of a low cost of manufacture with regard to both materials and labor, and which accordingly is then susceptible of low prices of sale to the consuming public, thereby making such rotary puller live center arrangements economically available to the buying public.

Still yet another object of the present invention is to provide a new and improved rotary puller live center arrangement which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
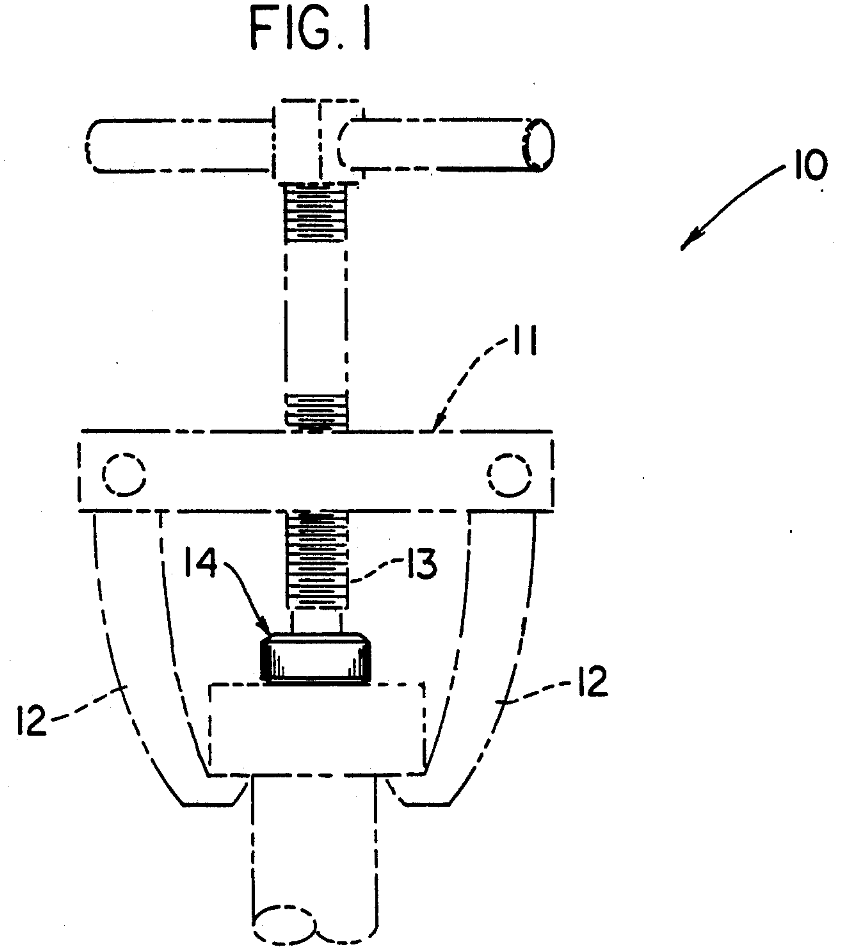
FIG. 1 is an orthographic view of the invention.
Figure 2:
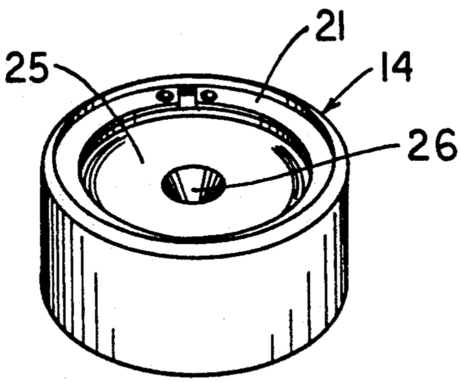
FIG. 2 is an isometric illustration of the positioning member.
Figure 3:
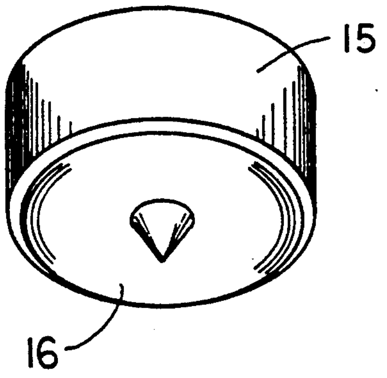
FIG. 3 is an isometric bottom view of the positioning member.
Figure 4:
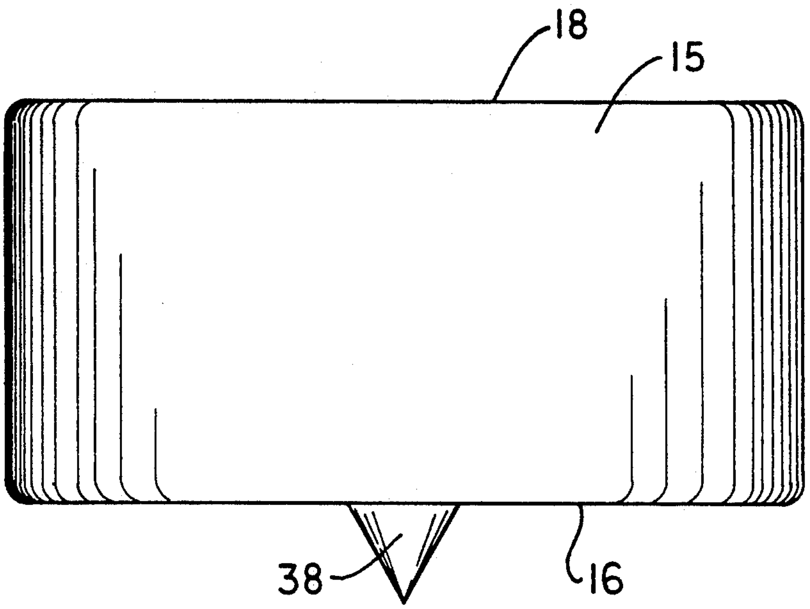
FIG. 4 is an orthographic side view of the positioning member.
Figure 5:
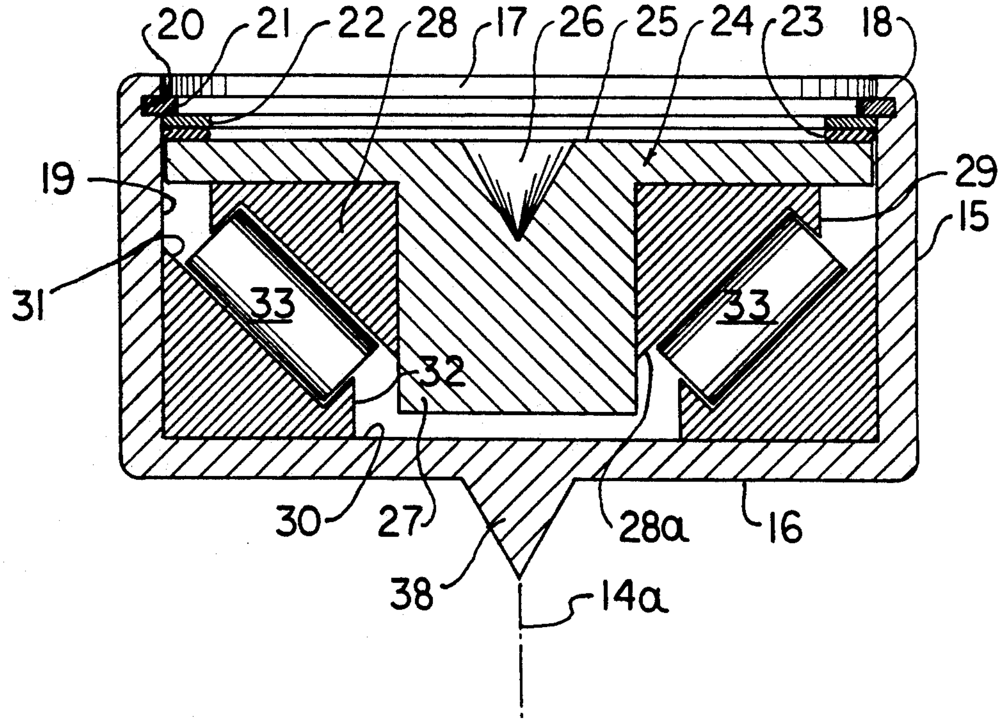
FIG. 5 is an orthographic cross-sectional illustration of the positioning member.
Figure 6:
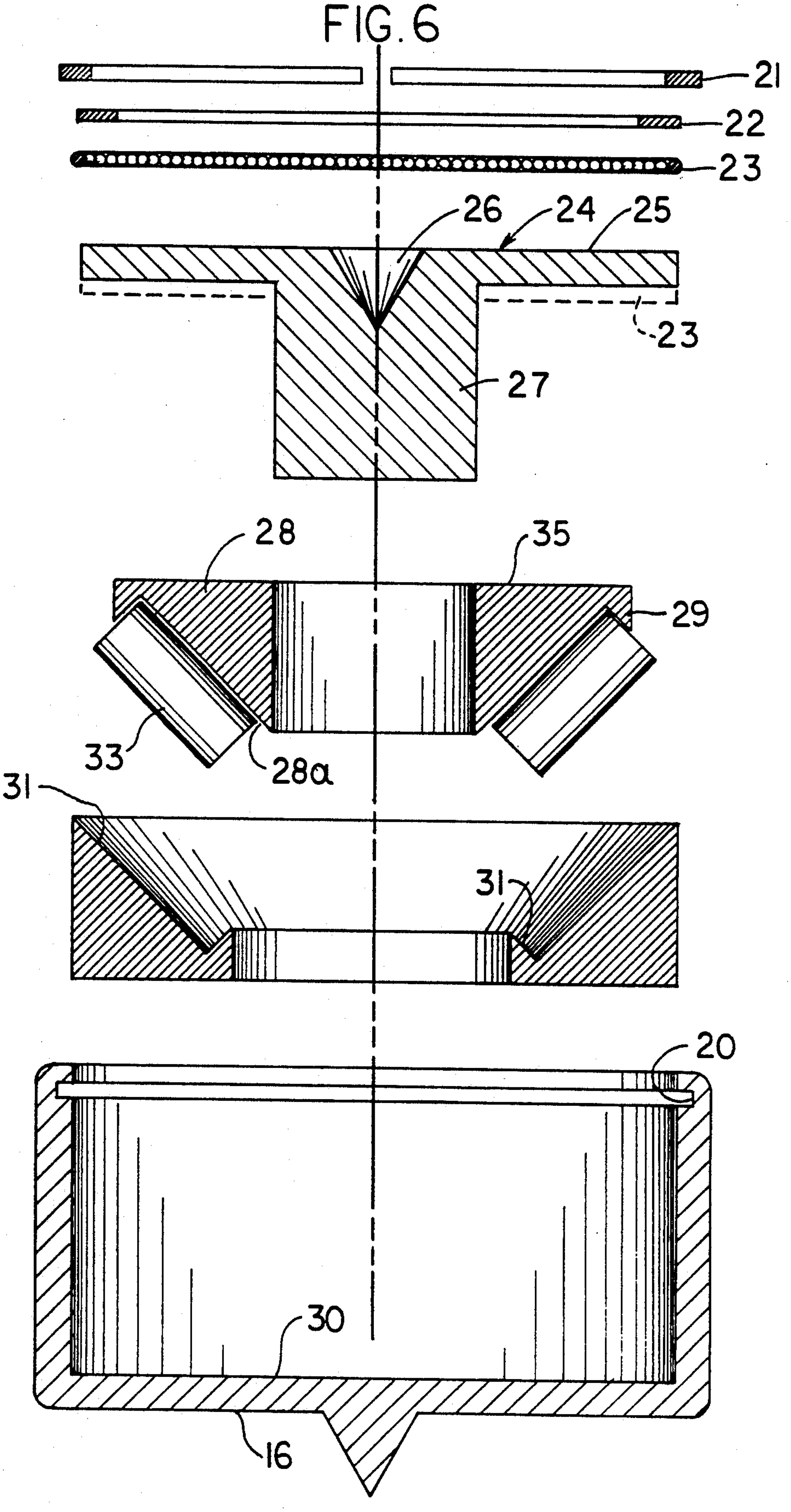
FIG. 6 is an exploded view of the positioning member.

With reference now to the drawings, and in particular to FIGS. 1 to 10 thereof, a new and improved rotary puller live center arrangement embodying the principles and concepts of the present invention and generally designated by the reference numeral 10 will be described.

More specifically, the rotary puller live center arrangement 10 of the instant invention essentially comprises cooperation with a screw puller 11, of a type as indicated in U.S. Pat. No. 4,011,648 incorporated herein by reference. The screw puller 11 includes pivotal screw puller arms 12 mounted to a support plate, with the threaded shaft 13 directed through the support plate, having a nose positioned within a positioning member 14. The positioning member 14 is mounted to the workpiece to be engaged by the arrangement 10.

The positioning member 14 includes a cylindrical housing 15, having a cylindrical side wall to include a housing bottom wall 16 spaced from a housing top wall central opening 17 directed coaxially along the axis 14*a* of the housing orthogonally intersecting the bottom wall, with the top wall central opening 17 having an annular flange 18 in surrounding engagement thereto. The cylindrical side wall includes a cylindrical side wall interior surface 19 having an annular locking groove 20 in adjacency to the annular flange 18 within the interior surface 19. A locking clip 21 is arranged for reception within the locking groove 20, wherein an annular lock ring washer 22 is arranged for imposing upon a plate bearing 23 of a Torrington (®) bearing 23. The plate bearing 23 interposed between the ring washer 22 and a rotary hub 24 permits ease of rotation of the rotary hub 24. The rotary hub 24 includes a top wall 25 engaging the plate bearing 23, wherein the top wall further includes a conical recess 26 to receive the nose of the threaded shaft 13. The conical recess 26 is aligned along the axis 14*a*. The rotary hub 24 includes a hub central boss 27, wherein the hub central boss 27 is received within a rotary conical hub 28 positioned in surrounding relationship relative to the hub central boss 27, with (see FIG. 6) a further plate bearing 23 interposed between a bottom surface of the rotary hub top wall 25 and the conical hub 28. The conical hub 28 includes a conical hub outer wall 28*a* oriented at substantially forty-five degrees relative to the axis 14*a*. An outer wall flange 29 orthogonally oriented relative to the outer wall retains a plurality of roller bearings 23 positioned in engagement with the conical outer wall 28*a*, with the outer wall flange 29 positioned to a first end of each bearing. A housing floor 30 of the housing 15 includes a housing floor conical wall 31 arranged parallel relative to the conical hub outer wall 28*a*, having a bearing wall flange 31*a* orthogonally oriented relative to the conical bearing wall 31 oriented at a second end of each the bearings 33 to capture the bearings 33 between the conical wall flange 29 and the conical bearing wall flange 31*a*. As noted above, the use of a further plate bearing 23 interposed between the conical hub top wall 35 and the rotary hub top wall 25 permits ease of rotation of the rotary hub 24 relative to the screw puller shaft 13.

Figure 7:
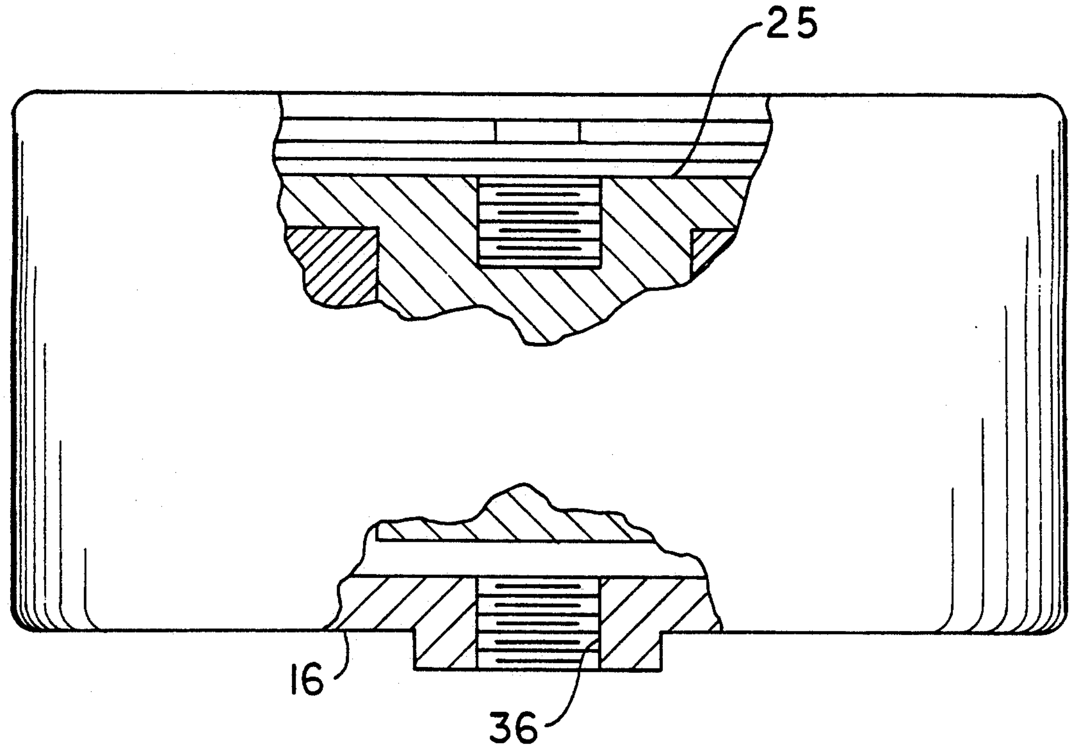
FIG. 7 is an orthographic view, partially in section, of a modified positioning member.
Figure 8:
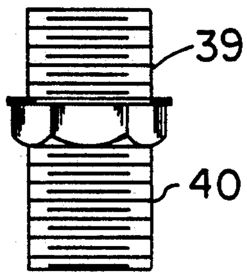
FIGS. 8, 9 and 10 are centering members for use with the positioning member of FIG. 7.
Figure 9:
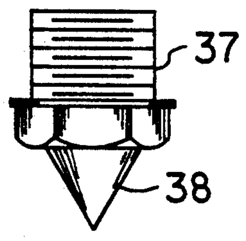
Figure 10:
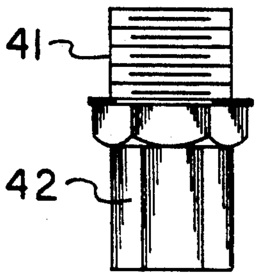

The FIG. 7 indicates the bottom wall 16 having a bottom wall threaded socket bore 36 to include a plurality of inserts to include a first insert 37, a second insert 39, and a third insert 41. The first insert 37 having a first insert conical projection 38 for reception within a workpiece or for proper alignment of the bottom wall 16, the second insert having an insert threaded shaft 40 is alternatively provided for reception within the socket bore 36. The third insert 41 includes a third insert hexagonal projection 42 for reception within a workpiece. As indicated in FIG. 7, the top wall 25 may be formed of a top wall threaded socket, as indicated, in lieu of the conical recess 26 to receive the various insert structure for utilization with the nose of a screw puller shaft 13 having a complementary configured surface.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A rotary puller live center arrangement, comprising, a screw puller, the screw puller having screw puller arms for engaging a workpiece, and a screw puller shaft medially of the arms, with the screw puller shaft having a shaft nose and a positioning member arranged for engaging the workpiece and simultaneously engaging the shaft nose, the positioning member having a positioning member bottom wall, and a positioning member top wall, with the top wall having a central opening directed therethrough, and a cylindrical side wall, the cylindrical side wall having a cylindrical side wall interior surface, and bearing means mounted within the interior surface for receiving the shaft nose, with the bearing means rotatably isolated relative to the housing bottom wall, and the side wall interior surface includes an annular locking groove in adjacency to the top wall, and a locking member received within the locking groove, and an annular locking ring washer positioned in adjacency to the locking clip, and the bearing means including a rotary hub mounted within the cylindrical housing between the ring washer and the housing bottom wall, and the rotary hub further including a rotary hub top wall, and a plate bearing interposed between the rotary hub top wall and the ring washer, and the cylindrical housing symmetrically oriented about a housing axis, and the top wall including a top wall conical recess directed into the top wall coaxially aligned with the housing axis.

2. A live center arrangement as set forth in claim 1 further including a conical hub, with the conical hub having a conical hub bore receiving the rotary hub therewithin, and the conical hub positioned in adjacency to the rotary hub top wall, the conical hub having a conical hub outer wall, the conical hub outer wall including an outer wall flange orthogonally oriented relative to the conical hub outer wall, and the housing having a housing floor, with a conical bearing wall fixedly mounted to the housing floor, with the conical bearing wall oriented at forty-five degrees relative to the housing axis, and oriented parallel relative to the conical hub outer wall, with the conical bearing wall including a conical bearing wall flange parallel to the outer wall flange, and a plurality of roller bearings interposed between the conical hub outer wall and the housing floor conical bearing wall.

3. A live center arrangement as set forth in claim 2 including a further plate bearing interposed between the rotary hub top wall and the conical hub.

4. A live center arrangement as set forth in claim 3 wherein the housing bottom wall includes a bottom wall threaded socket coaxially aligned relative to the housing axis, and a first insert, a second insert, and a third insert, with the first insert, the second insert, and the third insert threadedly and selectively received within the threaded socket, with the first insert having a first insert conical projection, the second insert having a second insert threaded shaft, and the third insert including a third insert hexagonal projection.

* * * * *